(12) United States Patent
Usui

(10) Patent No.: US 8,411,466 B2
(45) Date of Patent: Apr. 2, 2013

(54) OUTPUT CONTROLLED DC-TO-DC CONVERTER

(75) Inventor: Hiroshi Usui, Niiza (JP)

(73) Assignee: Sanken Electric Co., Ltd., Niiza-shi (JP)

( * ) Notice: Subject to any disclaimer, the term of this patent is extended or adjusted under 35 U.S.C. 154(b) by 233 days.

(21) Appl. No.: 12/824,590

(22) Filed: Jun. 28, 2010

(65) Prior Publication Data

US 2011/0007529 A1     Jan. 13, 2011

(30) Foreign Application Priority Data

Jul. 10, 2009  (JP) .................................. 2009-163618

(51) Int. Cl.
- *H02M 3/335* (2006.01)
- *H02M 3/24* (2006.01)
- *H02M 7/00* (2006.01)
- *H02M 7/06* (2006.01)
- *H02M 7/21* (2006.01)
- *H02M 7/5387* (2007.01)

(52) U.S. Cl. ............. 363/17; 363/126; 363/127; 363/98; 363/132; 363/21.06

(58) Field of Classification Search .................. 363/15, 363/17, 20, 21.01, 21.02, 21.08, 95, 97, 98, 363/125, 132, 126, 127, 21.06
See application file for complete search history.

(56) References Cited

U.S. PATENT DOCUMENTS

| | | | | |
|---|---|---|---|---|
| 5,815,384 A | * | 9/1998 | Hammond et al. | ............ 363/26 |
| 6,025,999 A | * | 2/2000 | Farrington et al. | ............ 363/16 |
| 7,009,853 B2 | * | 3/2006 | Nagel et al. | ............ 363/17 |
| 7,466,565 B2 | * | 12/2008 | Tanaka | ............ 363/16 |
| 7,505,288 B2 | * | 3/2009 | Duvnjak | ............ 363/21.18 |
| 7,768,801 B2 | * | 8/2010 | Usui et al. | ............ 363/21.06 |
| 2008/0284390 A1 | | 11/2008 | Usui | |
| 2009/0290384 A1 | * | 11/2009 | Jungreis | ............ 363/17 |

FOREIGN PATENT DOCUMENTS

JP     2005-39975     2/2005

OTHER PUBLICATIONS

U.S. Appl. No. 13/304,919, filed Nov. 28, 2011, Usui.
U.S. Appl. No. 12/781,238, filed May 17, 2010, Usui.

* cited by examiner

*Primary Examiner* — Bao Q Vu
*Assistant Examiner* — Zekre Tsehaye
(74) *Attorney, Agent, or Firm* — Oblon, Spivak, McClelland, Maier & Neustadt, L.L.P.

(57) ABSTRACT

The present invention includes: a plurality of switching elements connected in series and connected between two ends of a DC power supply; a first control circuit to alternately turn on and off the switching elements in response to a constant oscillation frequency signal; a series circuit including a primary winding of a transformer and a capacitor connected together in series, and being connected to a connecting point between the switching elements, and to an end of the DC power supply; a rectifying/smoothing circuit to rectify and smooth a voltage in a secondary winding of the transformer thereby to output a DC voltage; a control switching element connected to two ends of the primary or secondary winding of the transformer; and a second control circuit to control the DC voltage at a predetermined voltage by turning on and off the control switching element.

3 Claims, 12 Drawing Sheets

Vin=300V 100% LOAD

FIG. 2B
(PRIOR ART)

Vin=400V 100% LOAD

OUTPUT CONTROLLED DC-TO-DC CONVERTER

BACKGROUND OF THE INVENTION

1. Field of the Invention

The present invention relates to a DC-to-DC converter, and particularly to control of an output voltage from a DC-to-DC converter.

2. Description of the Related Art

Figure 1:
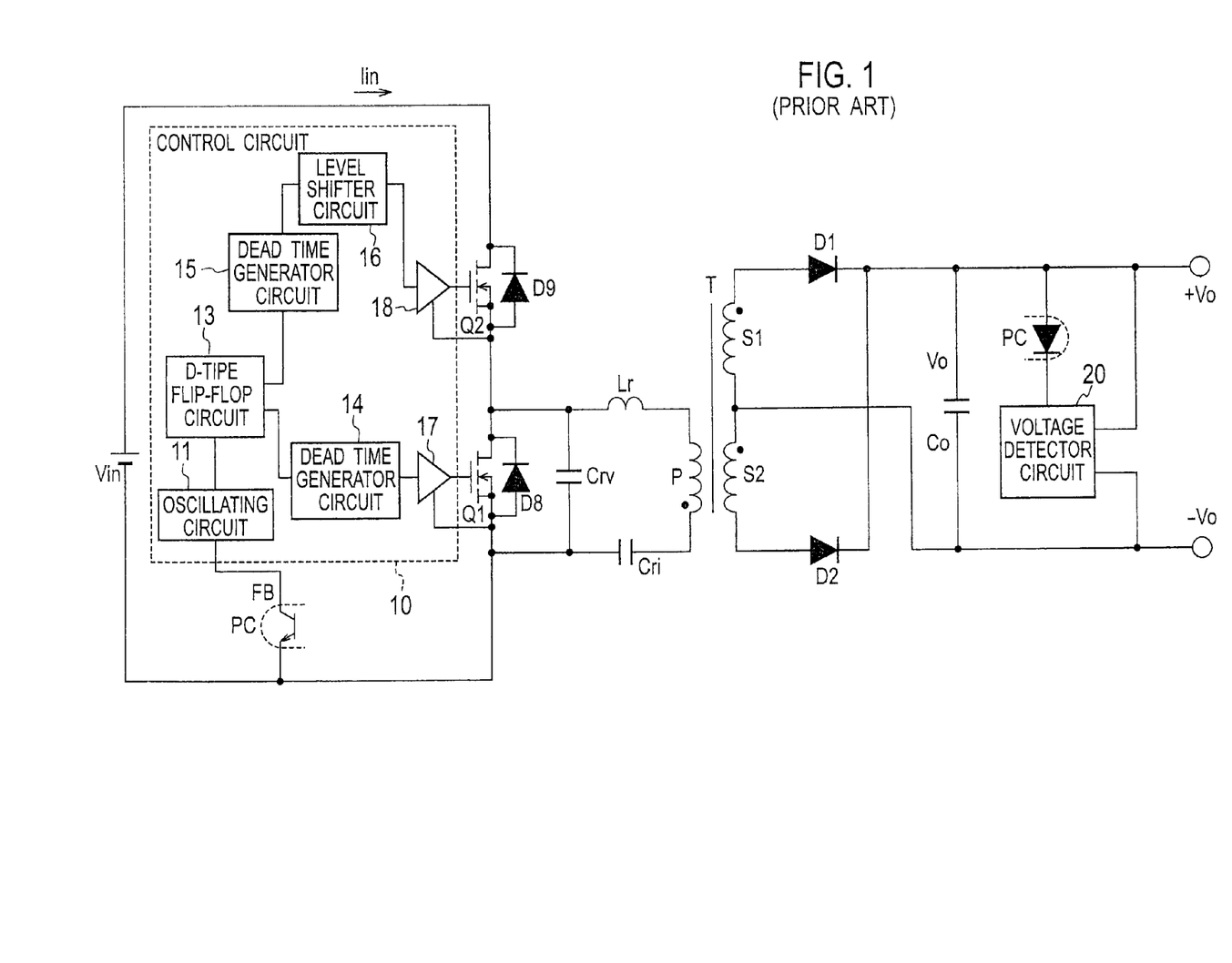
FIG. 1 is a circuit diagram showing a conventional DC-to-DC converter.

FIG. 1 is a circuit diagram showing a conventional DC-to-DC converter. Descriptions will be provided for an operation of the DC-to-DC converter shown in FIG. 1. To begin with, once a voltage is applied from a DC power supply Vin, an activation circuit (not illustrated) causes a control circuit 10 to start its operation. The control circuit 10 includes an oscillating circuit 11, a D-type flip-flop circuit 13, dead time generator circuits 14, 15, a level shifter circuit 16, and buffer circuits 17, 18. The control circuit 10 alternately turns on and off switching elements Q1, Q2 with a dead time.

Once the switching element Q2 is turned on, an electric current flows from and to the DC power supply Vin through the switching element Q2, a reactor Lr, a primary winding P and a current resonance capacitor Cri. This current is a combined current of: an excitation current flowing through an excitation inductance Lp on the primary side of a transformer T; and a load current supplied to a load from output terminals +Vo, −Vo via a primary winding P, a secondary winding S2, a diode D2, and a capacitor Co. The former current is a resonance current shaped like a sine wave, and produced by (the reactor Lr+the excitation inductance Lp) and the current resonance capacitor Cri. The former current has a low resonance frequency in comparison with an on-time of the switching element Q2, and thereby is observed as if a part of the sine wave were a triangular wave. The latter current is a resonance current shaped like a sine wave in which an element of resonance between the reactor Lr and the current resonance capacitor Cri appears.

Once the switching element Q2 is turned off, energy of the excitation current stored in the transformer T causes a voltage pseudo resonance among (the reactor Lr+the excitation inductance Lp), the current resonance capacitor Cri, and a voltage resonance capacitor Crv. At this time, a resonance frequency produced by the voltage resonance capacitor Cry with a small capacitance is observed as a voltage across each of the switching elements Q1, Q2. To put it specifically, once the switching element Q2 is turned off, the current of the switching element Q2 moves to the voltage resonance capacitor Cry. Once the voltage resonance capacitor Cry is discharged to zero volts, the current moves to a diode D8. The energy of the excitation current stored in the transformer T charges the current resonance capacitor Cri through the diode D8. If the switching element Q1 is turned on during this time period, the switching element Q1 is capable of operating as a zero-volt switch.

Once the switching element Q1 is turned on, a current flows from and to the current resonance capacitor Cri through the primary winding P, the reactor Lr and the switching element Q1 with the current resonance capacitor Cri being used as its power supply. This current is a combined current of: an excitation current flowing through the excitation inductance Lp of the transformer T; and a load current supplied to the load from the output terminals +Vo, −Vo via the primary winding P, the secondary winding S1, a diode D1, and the smoothing capacitor Co. The former current is a resonance current shaped like a sine wave, which is produced by (the reactor Lr+the excitation inductance Lp) and the current resonance capacitor Cri. The former current has a low resonance frequency in comparison with an on-time of the switching element Q1, and thereby is observed as if a part of the sine wave were a triangular wave. The latter current is a resonance current shaped like a sine wave in which an element of resonance between the reactor Lr and the current resonance capacitor Cri appears.

Once the switching element Q1 is turned off, energy of the excitation current stored in the transformer T causes a voltage pseudo resonance among (the reactor Lr+the excitation inductance Lp), the current resonance capacitor Cri, and the voltage resonance capacitor Crv. At this time, the resonance frequency produced by the voltage resonance capacitor Cry whose capacitance is small is observed as a voltage across each of the switching elements Q1, Q2. To put it specifically, once the switching element Q1 is turned off, the current of the switching element Q1 moves to the voltage resonance capacitor Cry. Once the voltage resonance capacitor Cry is charged up to the voltage of the DC power supply Vin, the current moves to a diode D9. The energy of the excitation current stored in the transformer T is regenerated in the DC power supply Vin through the diode D9. By being turned on during this time period, the switching element Q2 is capable of operating as a zero-volt switch.

Figure 2A:
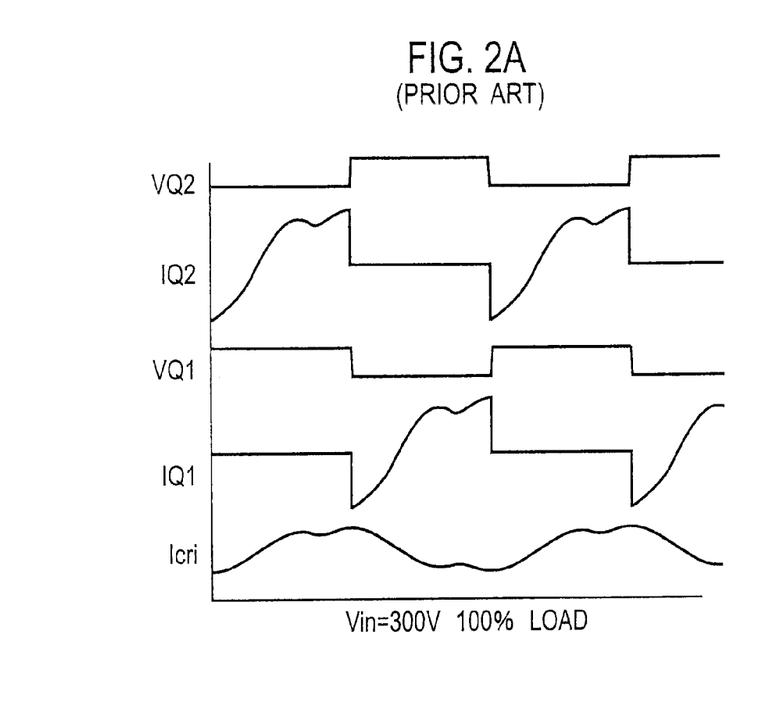
FIG. 2A is the diagram showing the waveforms observed when a voltage of a DC power supply Vin is 300V and the DC-to-DC converter is at 100% load (heavy load).
Figure 2B:
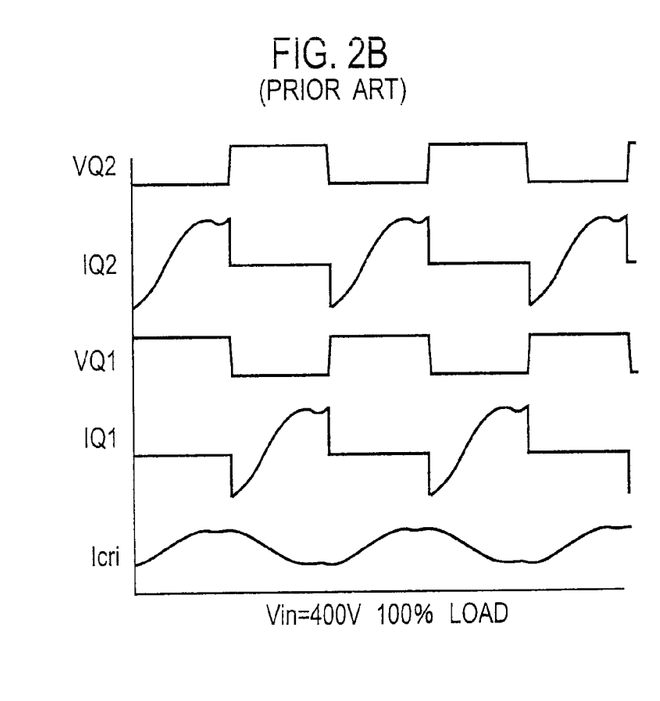
FIG. 2B is the diagram showing the waveforms observed when the voltage of the DC power supply Vin is 400V, and the DC-to-DC converter is at 100% load.
Figure 3A:
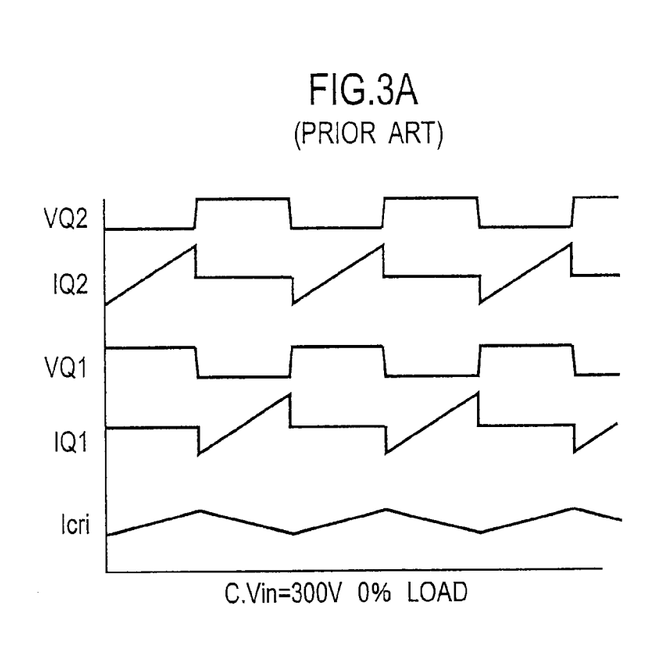
FIG. 3A is the diagram showing the waveforms observed when the voltage of the DC power supply Vin is 300V and the DC-to-DC converter is at 0% load (no load).
Figure 3B:
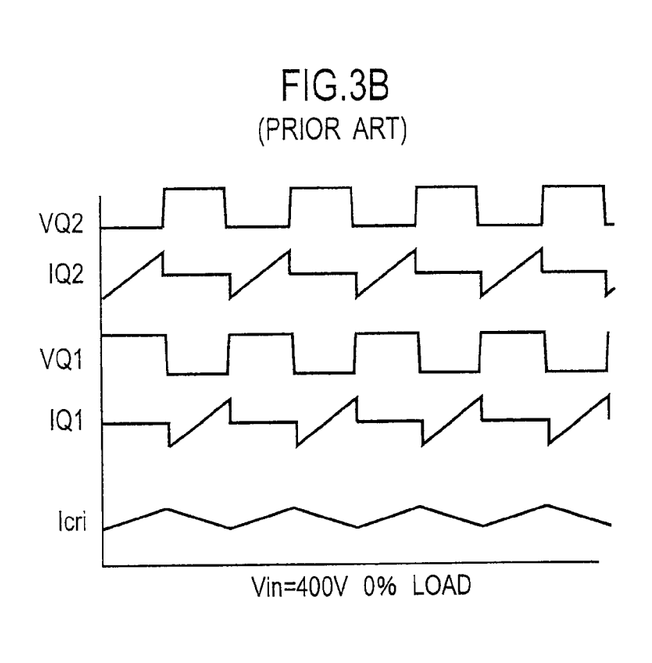
FIG. 3B is the diagram showing the waveforms observed when the voltage of the DC power supply Vin is 400V and the DC-to-DC converter is at 0% load.

FIG. 2A is a diagram showing waveforms observed when the voltage of the DC power supply Vin is 300V and the DC-to-DC converter is at 100% load (heavy load). FIG. 2B is a diagram showing waveforms observed when the voltage of the DC power supply Vin is 400V and the DC-to-DC converter is at 100% load. Comparison between FIG. 2A and FIG. 2B shows that the resonance current Icri flowing through the current resonance capacitor Cri is almost constant irrespective of whether the input voltage is large or small. However, in the waveforms under the lower input voltage, the frequency is lower, and the excitation current is larger. As step-up energy, part of this excitation current is stored in the reactor Lr, and largely contributes to the raising of the output voltage. The output voltage can be controlled by controlling the switching frequency. The output voltage is detected by an output voltage detector circuit 20, and the detected output voltage is transferred to a feedback terminal (FB terminal) of the control circuit 10 on the primary side of the DC-to-DC converter through a photocoupler PC. Thus, an oscillation frequency of the oscillating circuit 11 is regulated according to the output voltage. Note that: FIG. 3A is a diagram showing waveforms observed when the voltage of the DC power supply Vin is 300V and the DC-to-DC converter is at 0% load (no load); and FIG. 3B is a diagram showing waveforms observed when the voltage of the DC power supply Vin is 400V and the DC-to-DC converter is at 0% load.

Figure 4:
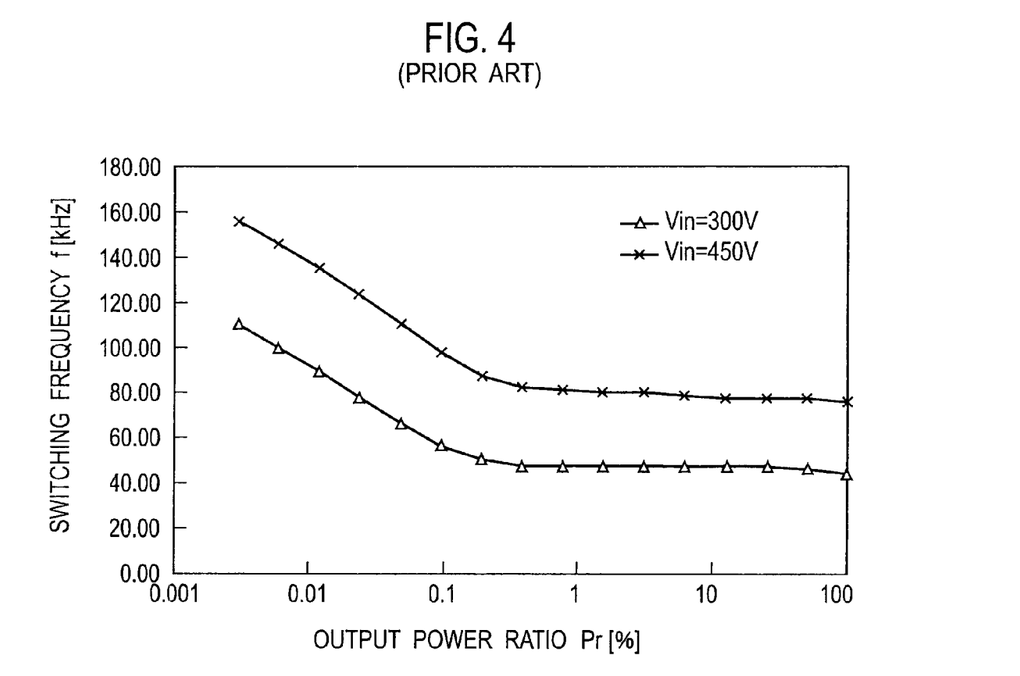
FIG. 4 is a diagram showing a relationship between an output power ratio and an oscillation frequency in the conventional DC-to-DC converter.

FIG. 4 is a diagram showing a relationship between an output power ratio and the switching frequency. As learned from FIG. 4, when the load is changed from heavy load to no load, the switching frequency needs to be increased almost four times from approximately 40 kHz to approximately 160 kHz. In recent years, DC-to-DC converters have been designed to operate at higher frequencies for downsizing. Particularly, such resonant DC-to-DC converters are circuits suitable to operate at higher frequencies because of their low switching loss.

Note that, for instance, a current-resonance converter described in Japanese Patent Application Publication No. 2005-39975 has been known as related prior art.

However, the frequency at no load needs to be approximately four times higher than the frequency at maximum power. For this reason, even the resonant DC-to-DC converter is incapable of coping with the rise in the frequency. For instance, if a circuit for a DC-to-DC converter is designed to operate at a frequency of 2 MHz at maximum load, the maximum frequency would go up as high as 8 MHz. For this reason, such a DC-to-DC converter cannot be put to practical use in consideration of factors such as electric power consumed to drive the switching elements and power loss caused by the control circuits. In the above case, the resonant DC-to-DC converter has to be used with the highest and lowest frequencies of approximately 2 MHz and 500 kHz, respectively.

Furthermore, if the highest and lowest frequencies are set high as described above, the range between the highest and lowest frequencies extend beyond a frequency range of AM radio broadcast. This makes it difficult to take EMC (electromagnetic compatibility) measures.

SUMMARY OF THE INVENTION

The present invention provides a DC-to-DC converter being downsized and producing less noise thanks to a transformer capable of operating at a higher frequency.

The present invention includes: a plurality of switching elements connected together in series and connected between two ends of a DC power supply; a first control circuit configured to alternately turn on and off the plurality of switching elements in response to a constant oscillation frequency signal; a series circuit in which a primary winding of a transformer and a capacitor are connected together in series, the series circuit being connected to a connecting point between the plurality of switching elements, and to an end of the DC power supply; a rectifying/smoothing circuit configured to rectify and smooth a voltage which occurs in a secondary winding of the transformer, and thus to output a DC voltage; a control switching element connected to two ends of any one of the primary and secondary windings of the transformer; and a second control circuit configured to control the DC voltage at a predetermined voltage by turning on and off the control switching element.

BRIEF DESCRIPTIONS OF THE DRAWINGS

FIGS. 2A and 2B are diagrams each showing waveforms of components of the conventional DC-to-DC converter.

FIGS. 3A and 3B are diagrams each showing waveforms of components of the conventional DC-to-DC converter.

FIGS. 8A and 8B are diagrams each showing waveforms of components of the DC-to-DC converter according to Embodiment 1 of the present invention.

FIGS. 9A and 9B are diagrams each showing waveforms of components of the DC-to-DC converter according to Embodiment 1 of the present invention.

DESCRIPTION OF THE PREFERRED EMBODIMENTS

Hereinafter, descriptions will be provided for embodiments of a DC-to-DC converter of the present invention by referring to the drawings.

Embodiment 1

Figure 5:
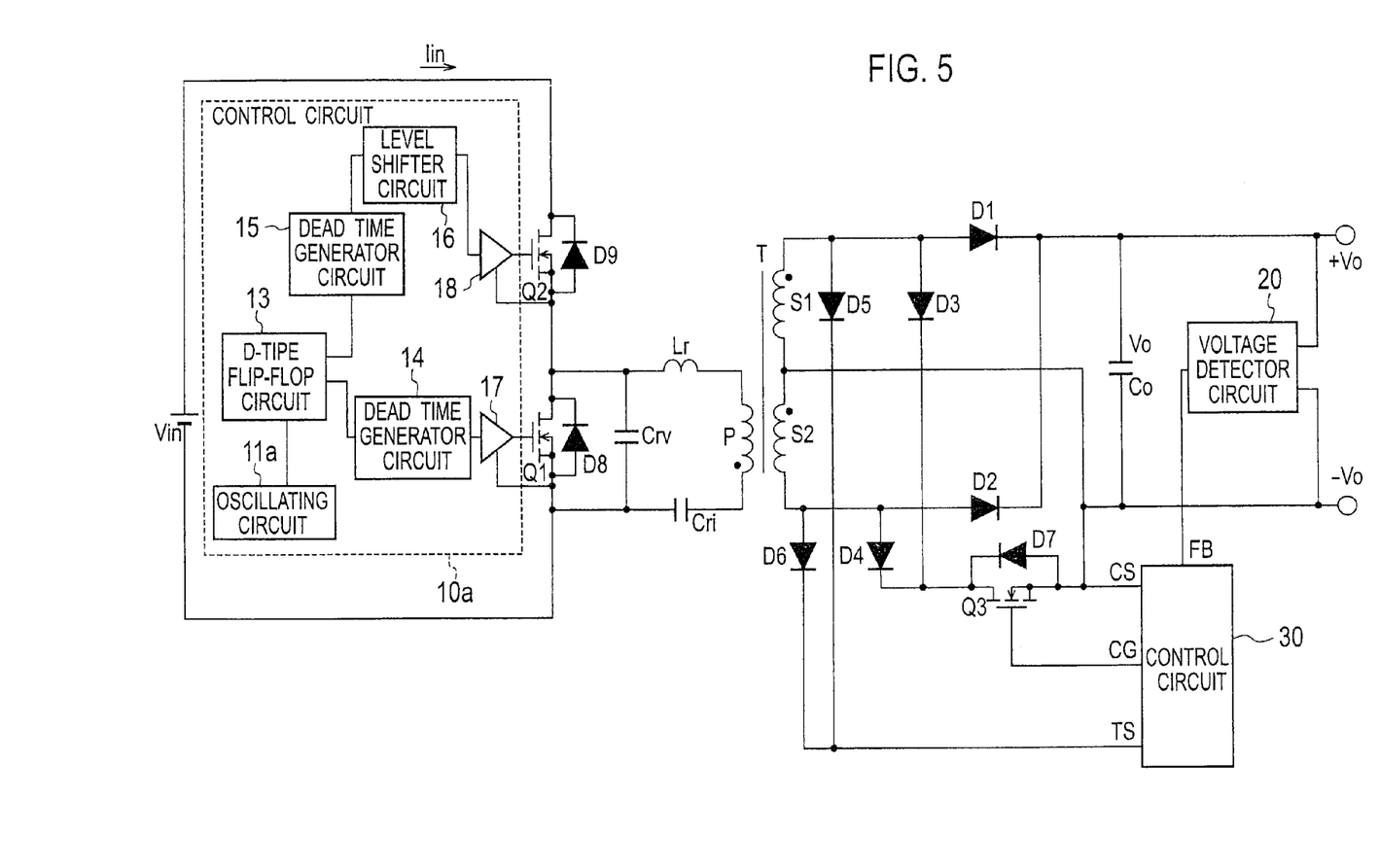
FIG. 5 is a circuit diagram of a DC-to-DC converter according to Embodiment 1 of the present invention.

FIG. 5 is a circuit diagram of a DC-to-DC converter according to Embodiment 1 of the present invention. The DC-to-DC converter according to Embodiment 1 shown in FIG. 5 includes the same components as the conventional DC-to-DC converter shown in FIG. 1, except that a control circuit 10a is provided instead of the control circuit 10. The DC-to-DC converter according to Embodiment 1 further includes: diodes D3, D4, D5, D6, D7; a switching element Q3 formed of a MOSFET (metal-oxide-semiconductor field-effect transistor); and a control circuit 30 for generating a control signal for the switching element Q3. Moreover, the photocoupler PC shown in FIG. 1, which is connected to an output of the voltage detector circuit 20, is eliminated, and the output of the voltage detector circuit 20 is connected to the control circuit 30 instead. As a result, the FB terminal is eliminated from the control circuit 10a.

Hereinbelow, detailed descriptions will be provided for the configuration of each component. A series circuit, which includes a switching element Q1 formed of a MOSFET and a switching element Q2 formed of another MOSFET, is connected to the two ends of a DC power supply Vin. A diode D8 is connected between the drain and source of the switching element Q1. A diode D9 is connected between the drain and source of the switching element Q2. The diodes D8, D9 may be parasitic diodes of the switching elements Q1, Q2, respectively. A series circuit, which includes a reactor Lr, a primary winding P of a transformer T and a current resonance capacitor Cri, is connected between the drain and source of the switching element Q1. In addition, a voltage resonance capacitor Cry is also connected between the drain and source of the switching element Q1.

A secondary winding S1 and a secondary winding S2 of the transformer T are connected together in series. Anodes of the respective diodes D1, D3, D5 are connected to a first end of the secondary winding S1, and anodes of the respective diodes D2, D4, D6 are connected to a first end of the secondary winding S2. Cathodes of the respective diodes D1 and D2 are connected to a first end of a smoothing capacitor Co, an output terminal +Vo, and a first end of the voltage detector circuit 20.

The voltage detector circuit 20 is configured to detect a voltage across the smoothing capacitor Co, and to output the detected voltage to an FB terminal of the control circuit 30. The cathodes of the respective diodes D5, D6 for timing detection are connected to a TS terminal of the control circuit 30. Cathodes of the respective diodes D3, D4 are connected to a cathode of the diode D7 and a drain of the switching element Q3. A gate of the switching element Q3 is connected to a CG terminal of the control circuit 30.

An anode of the diode D7 and a source of the switching element Q3 are connected to a connecting point between the secondary winding S1 and the secondary winding S2, as well as a CS terminal of control circuit 30, a second end of the smoothing capacitor Co, an output terminal −Vo, and a second terminal of the voltage detector circuit 20.

The control circuit 10a is configured to turn on and off the switching elements Q1, Q2 based on a fixed frequency produced by an oscillating circuit 11a. The control circuit 10a includes the oscillating circuit 11a, a D-type flip-flop circuit 13, dead time generator circuits 14, 15, a level shifter circuit 16, and buffer circuits 17, 18.

The oscillating circuit 11a is configured to oscillate and output a constant oscillation frequency signal (a signal with a fixed frequency). Based on the oscillation frequency signal from the oscillating circuit 11a, the D-type flip-flop circuit 13 is configured to generate a first pulse signal and a second pulse signal which alternately turn on and off at 50% duty.

The dead time generator circuit 14 is configured to delay the first pulse signal by a first dead time, and to output the thus-delayed first pulse signal, as a gate drive signal, to the switching element Q1 on the low side through the buffer circuit 17. The dead time generator circuit 15 is configured to delay the second pulse signal by a second dead time, and to output the thus-delayed second pulse signal, as a gate drive signal, to the switching element Q2 on the high side through the level shifter circuit 16 and the buffer circuit 18.

Figure 6:
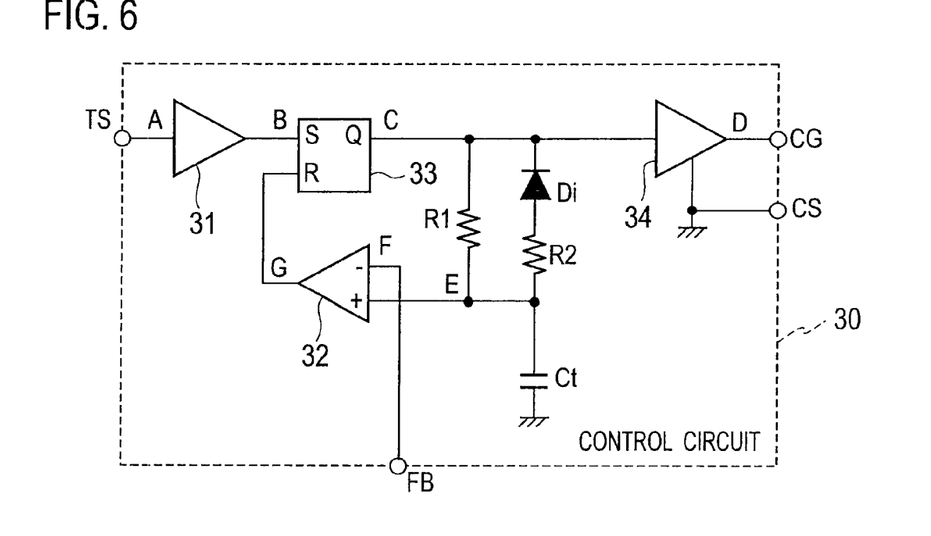
FIG. 6 is a circuit diagram showing details of a control circuit 30 in the DC-to-DC converter according to Embodiment 1 of the present invention.

FIG. 6 is a circuit diagram showing details of the control circuit 30 in the DC-to-DC converter according to Embodiment 1 of the present invention. The control circuit 30 includes a buffer circuit 31, a comparator 32, an FF circuit 33 formed of an flip-flop circuit, a drive circuit 34, resistors R1, R2, a diode Di, and a capacitor Ct. An input terminal of the buffer circuit 31 is connected to a TS terminal, and an output terminal of the buffer circuit 31 is connected to a set terminal (an S terminal) of the FF circuit 33.

An output terminal Q of the FF circuit 33 is connected to a first end of the resistor R1, a cathode of the diode D1, and an input terminal of the drive circuit 34. The FB terminal is connected to an inverse input terminal of the comparator 32. A non-inverse input terminal of the comparator 32 is connected to a second end of the resistor R1, a first end of the resistor R2 connected to an anode of the diode D1, and a first end of the capacitor Ct. A second terminal of the capacitor Ct and a CS terminal are grounded. An output terminal of the comparator 32 is connected to a reset terminal (an R terminal) of the FF circuit 33.

Figure 7:
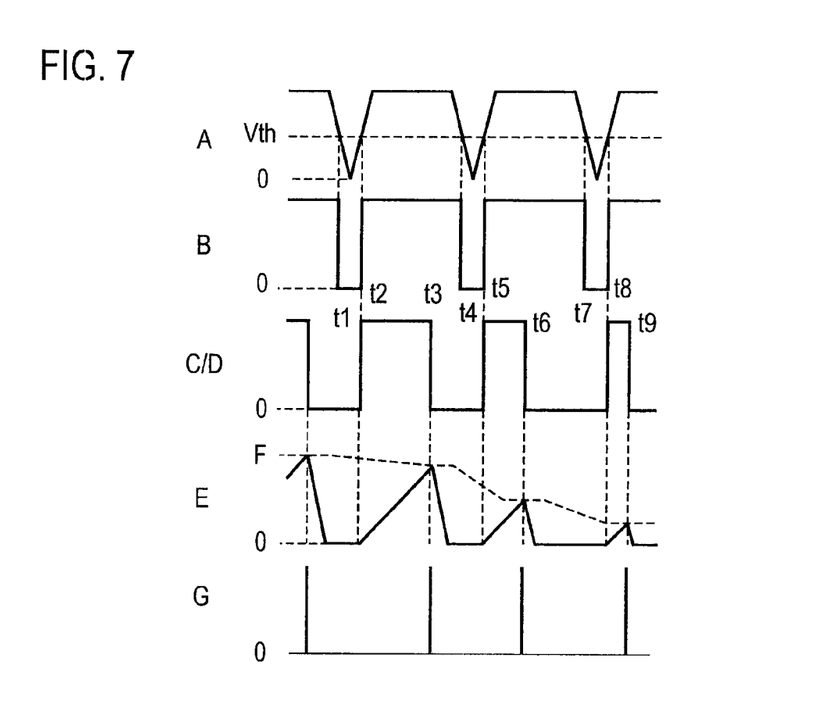
FIG. 7 shows waveforms of components of the control circuit 30 in the DC-to-DC converter according to Embodiment 1 of the present invention.

Next, explanations will be provided for how the control circuit 30 shown in FIG. 6 operates by referring to a timing chart shown in FIG. 7. First of all, the control circuit 30 reads the oscillation frequency of the oscillating circuit 11a on the primary side of the DC-to-DC converter through the transformer T by use of the diodes D5, D6, and inputs the thus-read oscillation frequency, as an oscillation frequency signal A, to the buffer circuit 31 through the TS terminal. The buffer circuit 31 converts the oscillation frequency signal A to a pulse signal B in a way that: when a voltage of the oscillation frequency signal A is equal to or lower than a threshold value Vth, the pulse signal B is set as an L-level signal; and when the voltage of the oscillation frequency signal A is higher than the threshold value Vth, the pulse signal B is set as an H-level signal.

The FF circuit 33 is set up at a leading edge of the pulse signal B outputted from the buffer circuit 31 (for instance, at times t2, t5, t8), and thus an H-level signal C/D is outputted from the output terminal Q. The capacitor Ct is gradually electrically charged through the resistor R1, and a voltage E of the capacitor Ct linearly increases.

Once the voltage E of the capacitor Ct becomes equal to a voltage F at the FB terminal (for instance, at times t3, t6, t9), an output G from the comparator 32 becomes the H-level. Because this H-level is inputted into the reset terminal R of the FF circuit 33, the FF circuit 33 is reset, and the output terminal Q of the FF circuit 33 accordingly becomes the L-level. For this reason, electric charges of the capacitor Ct are discharged through the resistor R1. In addition, the output from the FF circuit 33 is turned into an ON/OFF signal for the switching element Q3 through the drive circuit 34.

Accordingly, the switching element Q3 is turned on in synchronism with the frequency of the oscillation frequency signal of the oscillating circuit 11a on the primary side of the DC-to-DC converter, and is turned off according to a feedback signal (an FB signal) corresponding to an output voltage V0 from the FB terminal. Hence, the switching element Q3 performs PWM (pulse width modulation) control in synchronism with the oscillation frequency of the oscillating circuit 11a on the primary side of the DC-to-DC converter.

Next, descriptions will be provided for how the thus-configured DC-to-DC converter according to Embodiment 1 operates. To begin with, once a voltage is applied from the DC power supply Vin, an activation circuit (not illustrated) causes the control circuit 10a to start its operation. The control circuit 10a alternately turns on and off the switching elements Q1, Q2 with the dead time.

Once the switching element Q2 is turned on, an electric current flows from and to the DC power supply Vin through the switching element Q2, the reactor Lr, the primary winding P and the current resonance capacitor Cri. This current is a combined current obtained by combining: an excitation current (a first current) flowing through an excitation inductance Lp on the primary side of the transformer T; a short-circuit current (a second current) of the secondary winding S2 which flows via the primary winding P, the secondary winding S2, the diode D4 and the switching element Q3 while the switching element Q3 is on; and a load current (a third current) supplied to a load from the output terminals +Vo, −Vo via the primary winding P, the secondary winding S2, the diode D2, and the capacitor Co while the switching element Q3 is off.

In other words, the first current is a resonance current shaped like a sine wave, which is produced by resonance between (the reactor Lr+the excitation inductance Lp) and the current resonance capacitor Cri. The former current has a low resonance frequency in comparison with an on-time of the switching element Q2, and thereby is observed as if a part of the sine wave were a triangular wave.

The second current is a resonance current shaped like a sine wave in which an element of resonance between the reactor Lr and the current resonance capacitor Cri appears, because the secondary winding S2 is short-circuited. Incidentally, because the voltage of the primary winding P is zero volts at this time and a relatively large voltage is applied to the reactor Lr, the second current is a resonance current with a steep waveform. The third current is a resonance current shaped like a sine wave in which the element of resonance between the reactor Lr and the current resonance capacitor Cri appears.

Once the switching element Q2 is turned off, energy of the excitation current, which is stored in the transformer T, causes a voltage pseudo resonance among (the reactor Lr+the excitation inductance Lp), the current resonance capacitor Cri, and the voltage resonance capacitor Cry. At this time, a resonance frequency produced by the voltage resonance capacitor Cry whose capacitance is small is observed as a voltage across each of the switching elements Q1, Q2. To put it specifically, once the switching element Q2 is turned off, the current of the switching element Q2 moves to the voltage resonance capacitor Cry. Once the voltage resonance capacitor Cry is discharged to zero volts, the current moves to the diode D8. The energy of the excitation current which is stored in the transformer T charges the current resonance capacitor Cri through the diode D8. If the switching element Q1 is turned on during this time period, the switching element Q1 is capable of operating as a zero-volt switch.

Once the switching element Q1 is turned on, an electric current flows from and to the DC power supply Vin from and to the current resonance capacitor Cri through the primary winding P, the reactor Lr and the switching element Q1 with the current resonance capacitor Cri being used as its power supply. This current is a combined current obtained by combining: an excitation current (a first current) flowing through an excitation inductance Lp of the transformer T; a short-circuit current (a second current) of the secondary winding S1 which flows via the primary winding P, the secondary winding S1, the diode D3 and the switching element Q3 while the switching element Q3 is on; and a load current (a third current) supplied to the load from the output terminals +Vo, −Vo via the primary winding P, the secondary winding S1, the diode D1, and the smoothing capacitor Co while the switching element Q3 is off.

In other words, the first current is a resonance current shaped like a sine wave, which is produced by resonance between (the reactor Lr+the excitation inductance Lp) and the current resonance capacitor Cri. The former current has a low resonance frequency in comparison with an on-time of the switching element Q1, and thereby is observed as if a part of the sine wave were a triangular wave.

The second current is a resonance current shaped like a sine wave in which an element of resonance between the reactor Lr and the current resonance capacitor Cri appears, because the secondary winding S1 is short-circuited. Incidentally, because the voltage of the primary winding P is zero volts at this time and a relatively large voltage is applied to the reactor Lr, the second current is a resonance current with a steep waveform. The third current is a resonance current shaped like a sine wave in which the element of resonance between the reactor Lr and the current resonance capacitor Cri appears.

Once the switching element Q1 is turned off, energy of the excitation current, which is stored in the transformer T, causes a voltage pseudo resonance among (the reactor Lr+the excitation inductance Lp), the current resonance capacitor Cri, and the voltage resonance capacitor Cry. At this time, a resonance frequency produced by the voltage resonance capacitor Cry whose capacitance is small is observed as a voltage across each of the switching elements Q1, Q2. To put it specifically, once the switching element Q1 is turned off, the current of the switching element Q1 moves to the voltage resonance capacitor Cry. Once the voltage resonance capacitor Cry is charged up to the voltage of the DC power supply Vin, the current moves to the diode D9. The energy of the excitation current which is stored in the transformer T is regenerated in the DC power supply Vin through the diode D9. If the switching element Q2 is turned on during this time period, the switching element Q2 is capable of operating as a zero-volt switch.

Figure 8A:
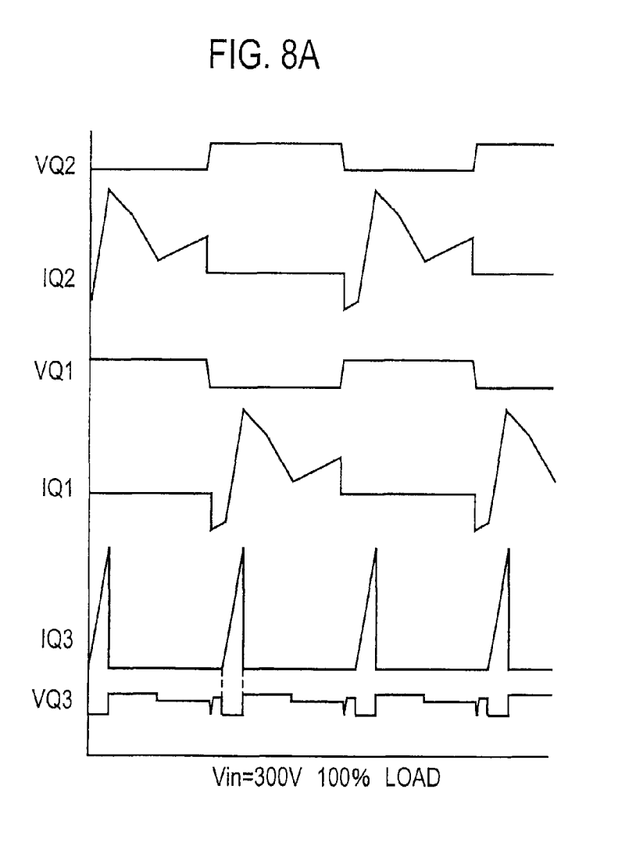
FIG. 8A is the diagram showing the waveforms thereof which are observed when a voltage of a DC power supply Vin is 300 volts, and the DC-to-DC converter is at 100% load (heavy load).
Figure 8B:
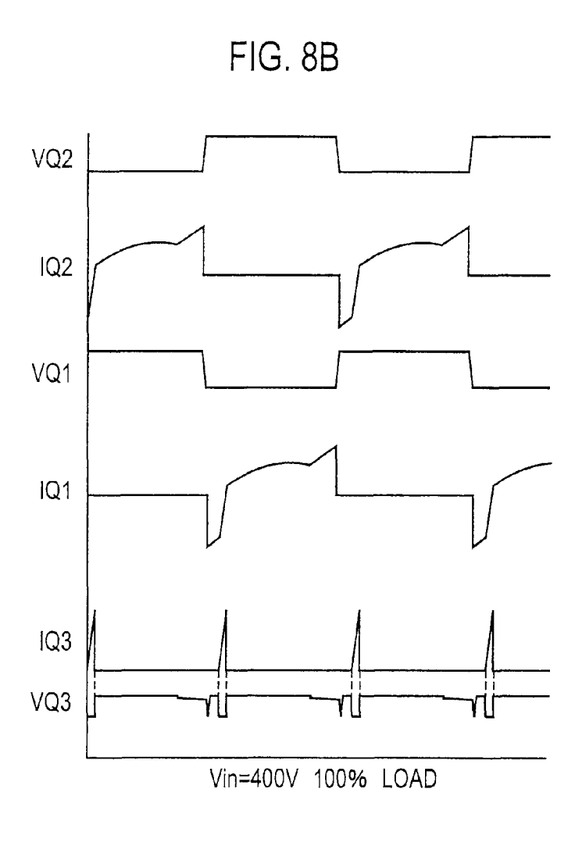
FIG. 8B is the diagram showing the waveforms thereof which are observed when the voltage of the DC power supply Vin is 400 volts, and the DC-to-DC converter is at 100% load.
Figure 9A:
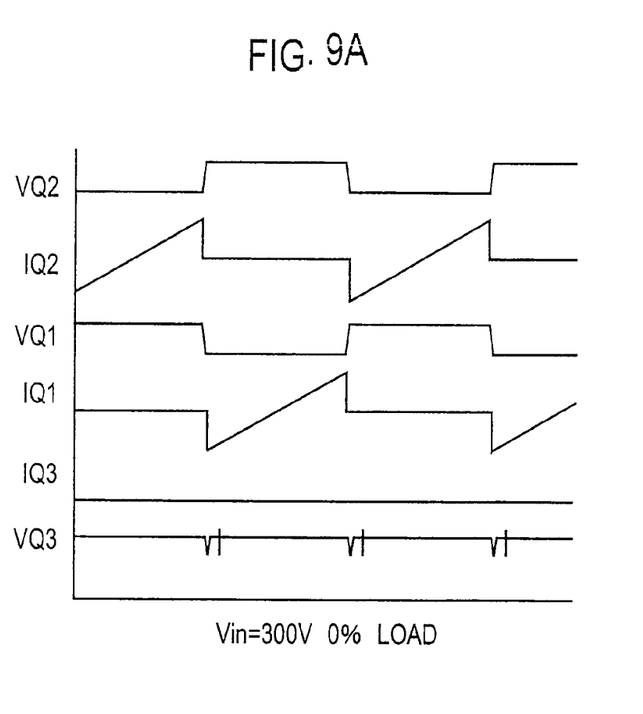
FIG. 9A is the diagram showing the waveforms thereof which are observed when the voltage of the DC power supply Vin is 300 volts, and the DC-to-DC converter is at 0% load (no load).
Figure 9B:
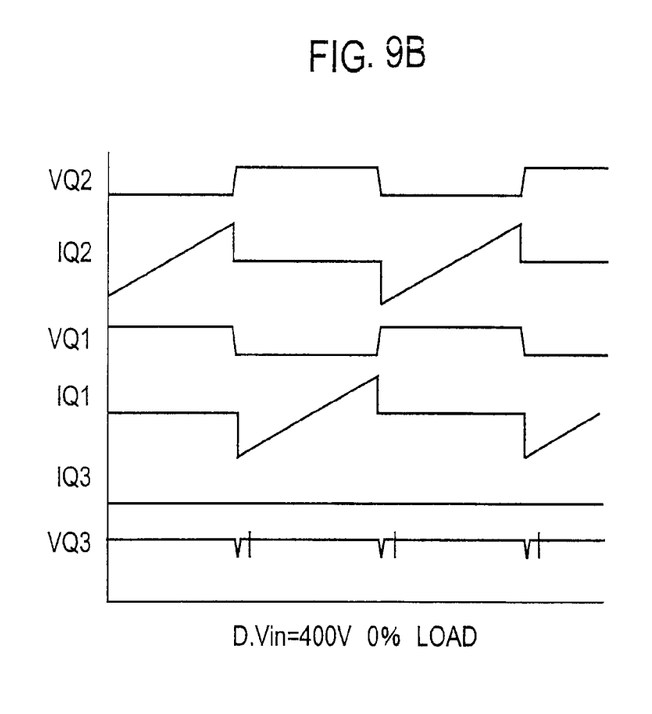
FIG. 9B is the diagram showing the waveforms thereof which are observed when the voltage of the DC power supply Vin is 400 volts, and the DC-to-DC converter is at 0% load.

FIG. 8A shows a diagram of waveforms which are observed when the voltage of the DC power supply Vin is 300V, and the DC-to-DC converter is at 100% load (heavy load). FIG. 8B shows a diagram of waveforms which are observed when the voltage of the DC power supply Vin is 400V, and the DC-to-DC converter is at 100% load. FIG. 9A shows a diagram of waveforms which are observed when the voltage of the DC power supply Vin is 300V, and the DC-to-DC converter is at 0% load (no load). FIG. 9B shows a diagram of waveforms which are observed when the voltage of the DC power supply Vin is 400V, and the DC-to-DC converter is at 0% load. Note that throughout FIGS. 8A to 9B, VQ1 denotes a voltage between the drain and source of the switching element Q1; IQ1 denotes a current at the drain of the switching element Q1; VQ2 denotes a voltage between the drain and source of the switching element Q2; IQ2 denotes a current at the drain of the switching element Q2; VQ3 denotes a voltage between the drain and source of the switching element Q3; and IQ3 denotes a current at the drain of the switching element Q3.

In the case of the DC-to-DC converter according to Embodiment 1, the oscillation frequency of the oscillating circuit 11a on the primary side is fixed. For this reason, when the input voltage becomes lower, the output voltage needs to be raised. In Embodiment 1, the voltage raising operation is carried out by turning on and off the switching element Q3. To put it specifically, energy for raising the voltage is stored in the reactor Lr through the transformer T when the switching element Q3 is turned on.

Once the switching element Q3 is turned off, the energy stored in the reactor Lr appears as a voltage, and the voltage raising operation is carried out. The output voltage Vo can be controlled at a constant voltage by applying PWM control to an ON time of the switching element Q3 based on the FB signal from the FB terminal.

Because the oscillating circuit 11a uses the fixed frequency as described above, the DC-to-DC converter according to Embodiment 1 can easily operate the transformer at a higher frequency with no fluctuation in the frequency. Designing the transformer to operate at the higher frequency allows the DC-to-DC converter to be downsized and to reduce noise.

Recently, DC-to-DC converters are often equipped with a power-factor improvement converter in their preceding stage for suppressing a high-frequency current which occurs in commercial power supply. In a case where the DC-to-DC converter according to Embodiment 1 is installed in a stage posterior to a power-factor improvement converter, an output from the power-factor improvement converter is kept almost constant. For this reason, the DC-to-DC converter according to Embodiment 1 need not carry out the voltage raising operation more than necessary, and the switching element Q3 is rarely turned on. This makes it possible to construct the DC-to-DC converter which is highly efficient without carrying out an unnecessary voltage raising operation.

In other words, the voltage raising operation is required by turning on and off the switching element Q3 only when the input voltage drops in case of instantaneous power failure. Hence, the efficiency for a normal operation can be kept at a higher level.

Embodiment 2

Figure 10:
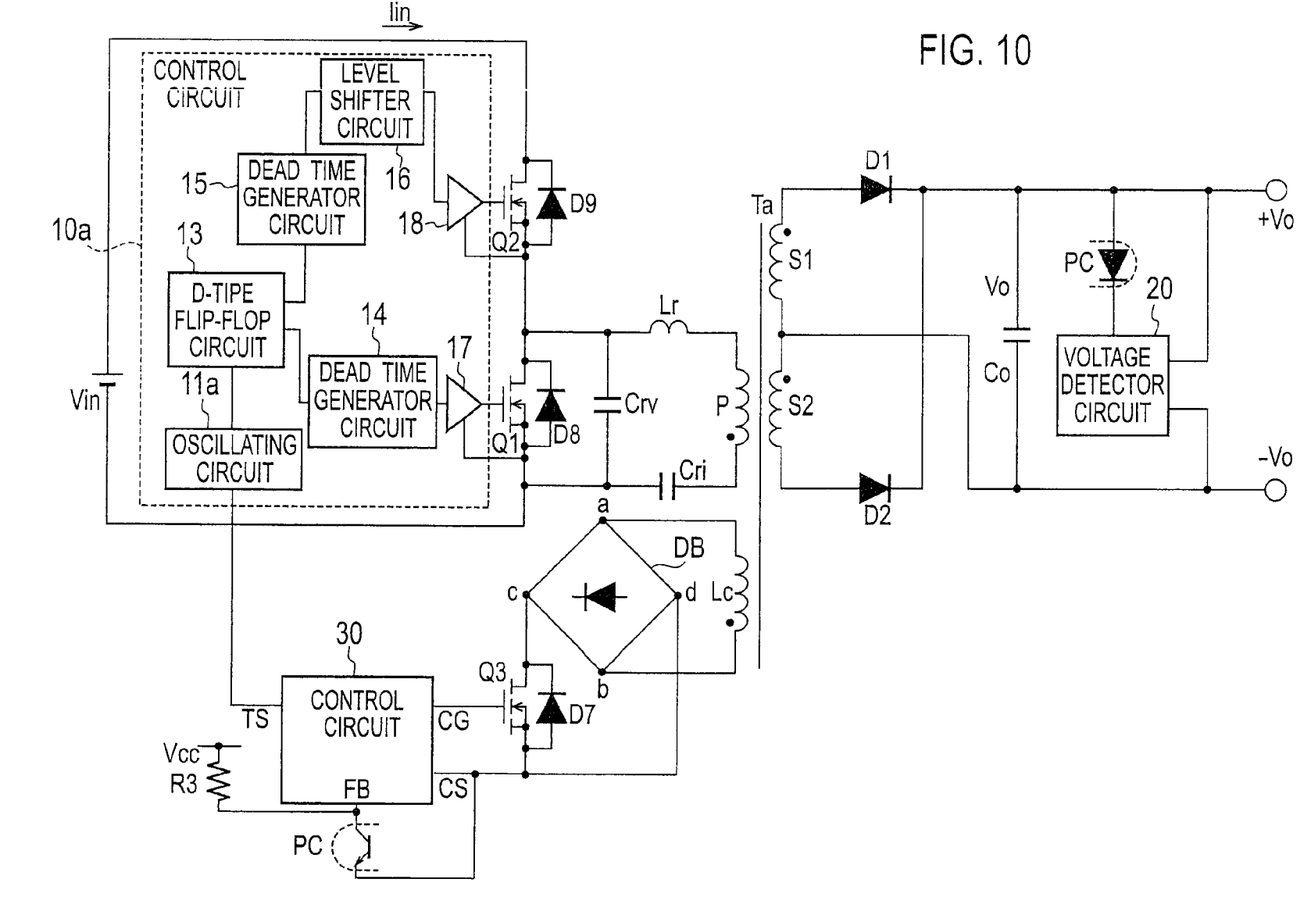
FIG. 10 is a circuit diagram of a DC-to-DC converter according to Embodiment 2 of the present invention.

FIG. 10 is a circuit diagram of a DC-to-DC converter according to Embodiment 2 of the present invention. In addition to the components of the conventional DC-to-DC converter shown in FIG. 1, the DC-to-DC converter according to Embodiment 2 shown in FIG. 10 further includes: a control winding Lc (serving as a tertiary winding) configured to be electromagnetically coupled with the primary winding P and secondary windings S1, S2; a diode bridge DB whose terminals a, b are connected to the respective two ends of the control winding Lc; a switching element Q3 whose drain and source are respectively connected to terminals c, d of the diode bridge DB; a diode D7 connected between the drain and source of the switching element Q3; a control circuit 30; and a resistor R3.

In the control circuit 30: the TS terminal is connected to the oscillating circuit 11a; the FB terminal is connected to the phototransistor of the photocoupler PC; the CG terminal is connected to the gate of the switching element Q3; and the CS terminal is connected to the source of the switching circuit Q3, the anode of the diode D7, the emitter of the phototransistor of the photocoupler PC, and the terminal d of the diode bridge DB. A voltage is applied to the FB terminal from a power supply Vcc through the resistor R3. The FB signal is inputted into the FB terminal of the control circuit 30 from the voltage detector circuit 20 through the photocoupler PC.

In the case of the thus-configured DC-to-DC converter according to Embodiment 2, the control circuit 30 generates a pulse signal by receiving the oscillation frequency signal with the fixed frequency from the oscillation circuit 11a, and receives the FB signal at its FB terminal from the voltage detector circuit 20 through the photocoupler PC, as well as thus applies PWM control to the switching element Q3 based on the pulse signal and the FB signal. Accordingly, the DC-to-DC converter according to Embodiment 2 can ensure the same effects as can the DC-to-DC converter according to Embodiment 1.

Embodiment 3

Figure 11:
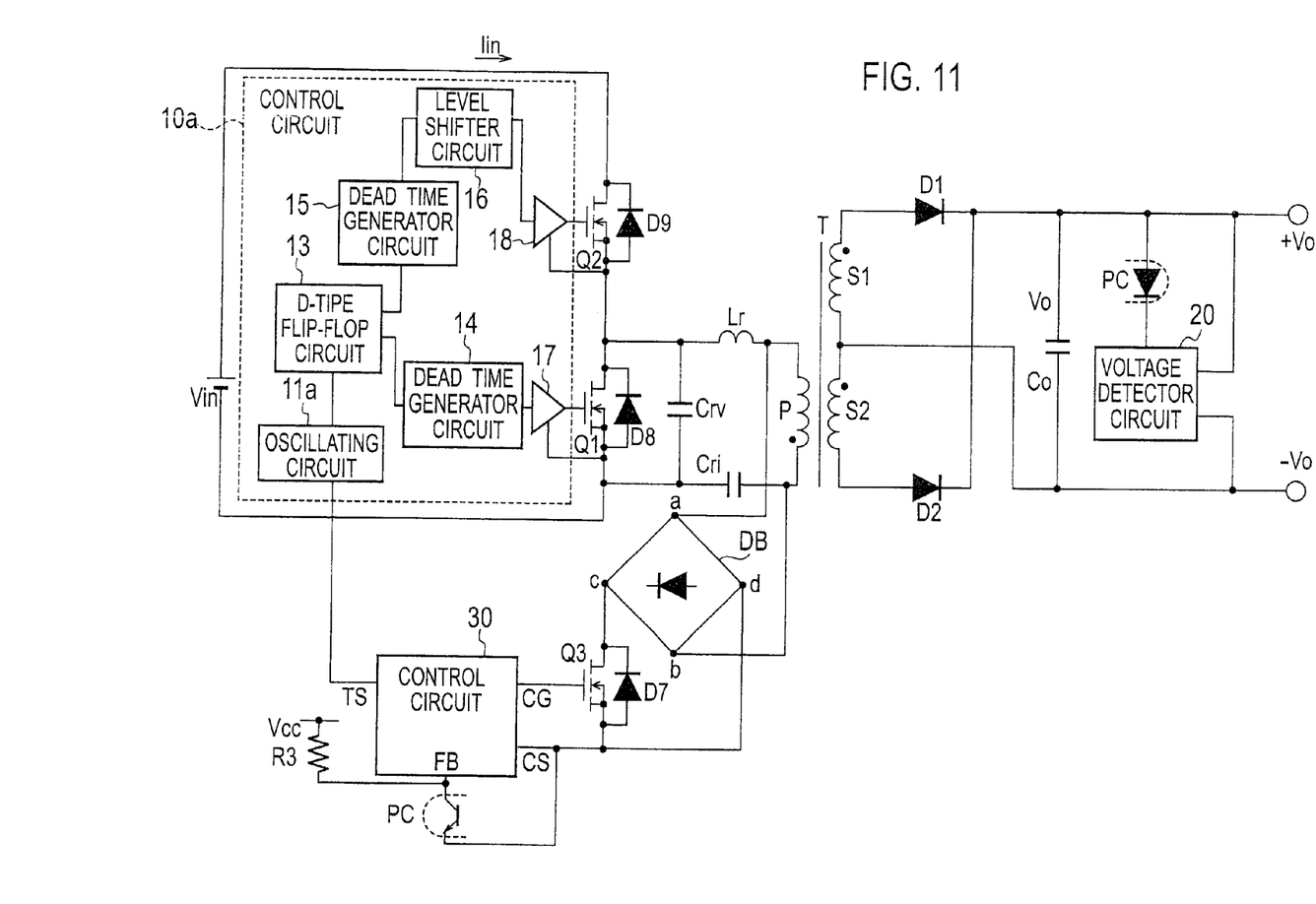
FIG. 11 is a circuit diagram of a DC-to-DC converter according to Embodiment 3 of the present invention.

FIG. 11 is a circuit diagram of a DC-to-DC converter according to Embodiment 3 of the present invention. The DC-to-DC converter according to Embodiment 3 shown in FIG. 11 includes the same components as does the DC-to-DC converter according to Embodiment 2 shown in FIG. 10, except that: the control winding Lc is eliminated; and the terminals a, b of the diode bridge DB are instead connected to the respective two ends of the primary winding P of the transformer T.

The thus-configured DC-to-DC converter according to Embodiment 3 can ensure the same effects as can the DC-to-DC converter according to Embodiment 2.

Embodiment 4

Figure 12:
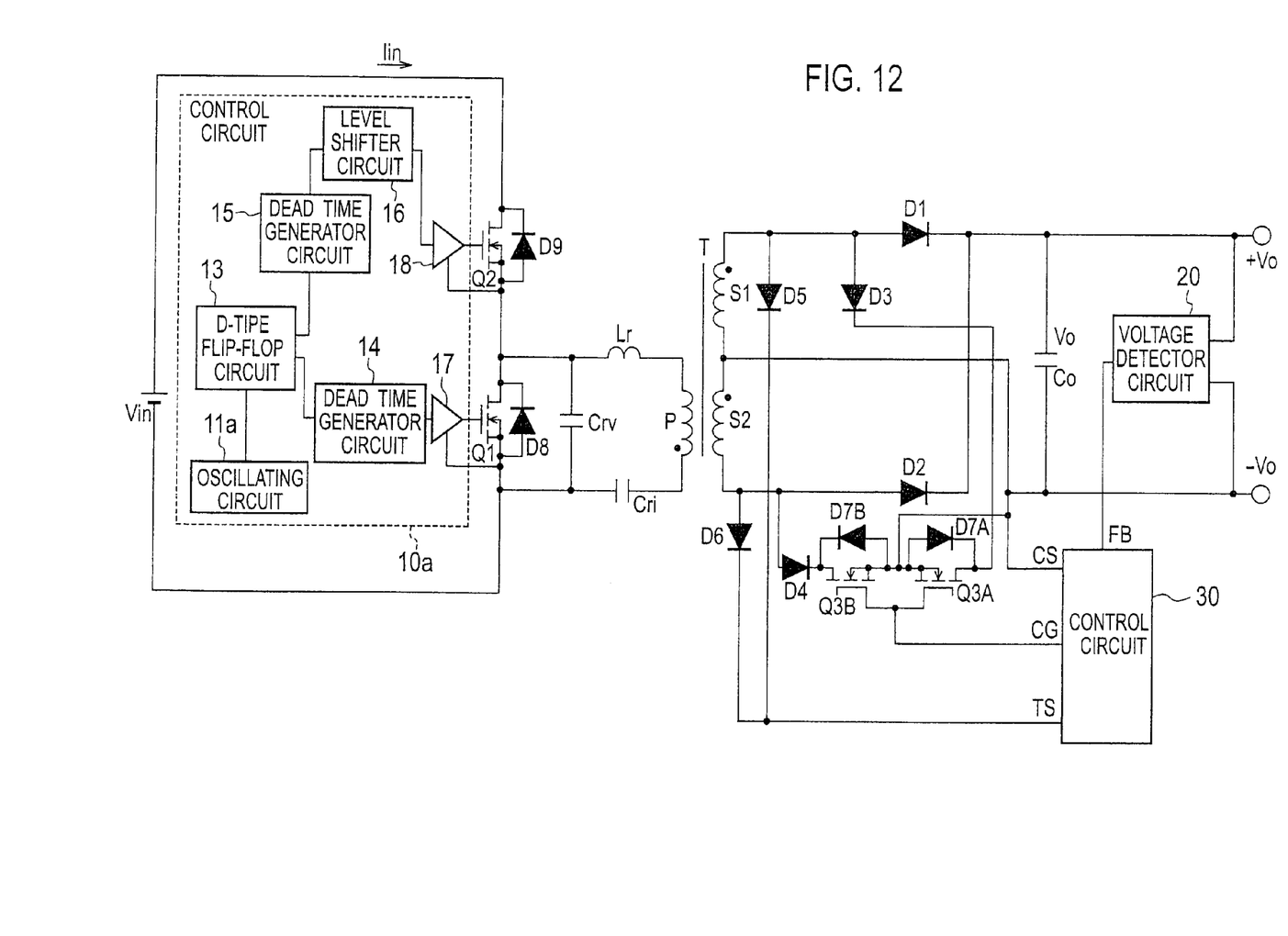
FIG. 12 is a circuit diagram of a DC-to-DC converter according to Embodiment 4 of the present invention.

FIG. 12 is a circuit diagram of a DC-to-DC converter according to Embodiment 4 of the present invention. The DC-to-DC converter according to Embodiment 4 shown in FIG. 12 includes the same components as does the DC-to-DC converter according to Embodiment 1 shown in FIG. 5, except that a series circuit, in which a switching element Q3A formed of a MOSFET and a switching element Q3B formed of a MOSFET are connected together in series, is provided instead of the switching element Q3 placed between the diode D4 and the diode D3.

To put it specifically, a drain of the switching element Q3B and a cathode of the diode D7 are connected to a cathode of the diode D4. A source of the switching element Q3A, an anode of the diode D7A, and the CS terminal of the control circuit 30 are connected to a source of the switching element Q3B and an anode of the diode D7B. A drain of the switching element Q3A and a cathode of the diode D7A are connected to a cathode of the diode D3. A gate of the switching element Q3A and a gate of the switching element Q3B are connected to the CG terminal of the control circuit 30.

In the case of the thus-configured DC-to-DC converter according to Embodiment 4, once the switching element Q2 is turned on, a short-circuit current flows in the secondary winding S2 through the primary winding P, the secondary winding S2, the diode D4 and the switching element Q3B while the switching elements Q3A, Q3B are on.

Once the switching element Q1 is turned on, a short-circuit current flows in the secondary winding S1 through the primary winding P, the secondary winding S1, the diode D3 and the switching element Q3A while the switching elements Q3A, Q3B are on.

In this manner, the DC-to-DC converter according to Embodiment 4 can ensure the same effects as can the DC-to-DC converter according to Embodiment 1.

Embodiment 5

Figure 13:
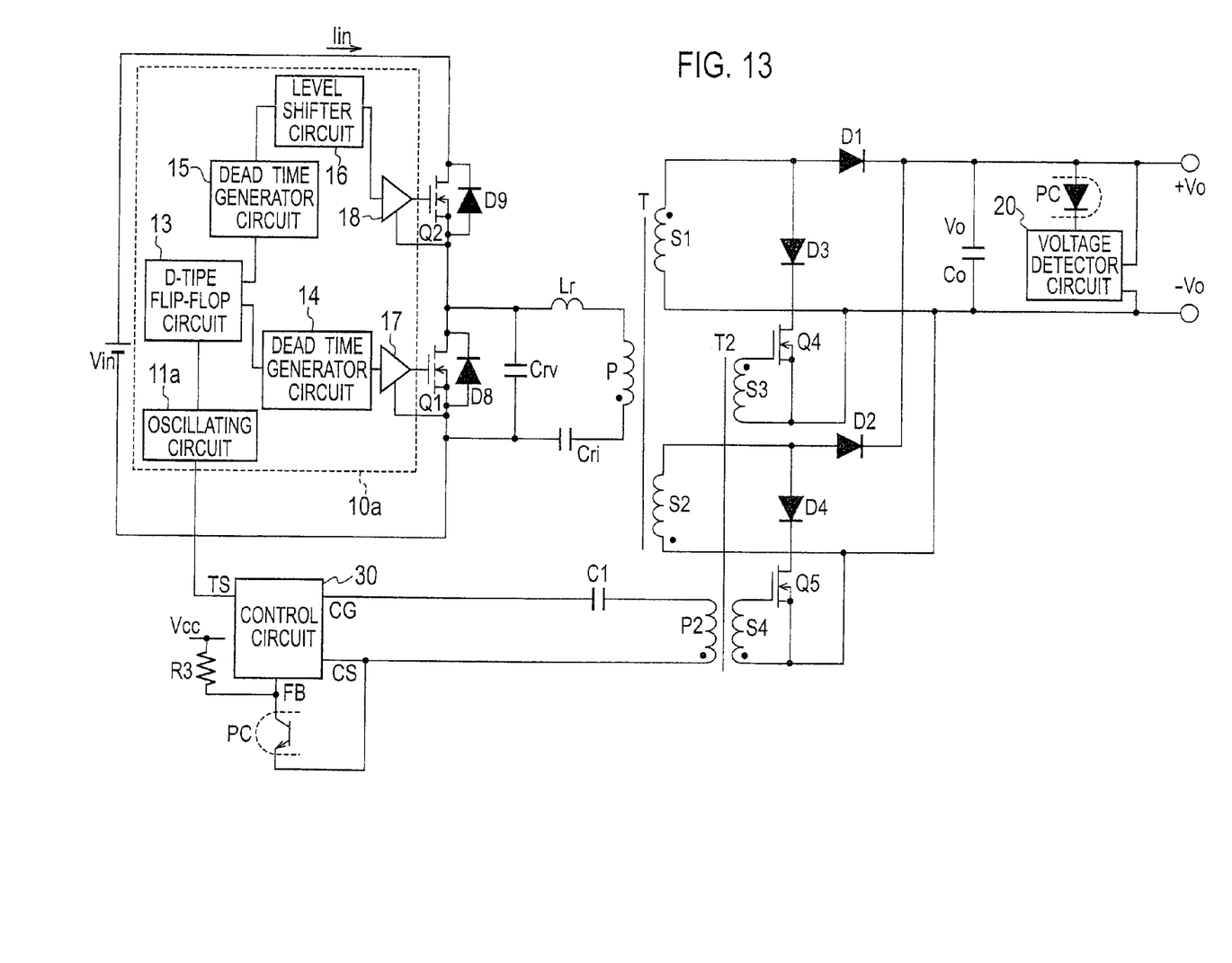
FIG. 13 is a circuit diagram of a DC-to-DC converter according to Embodiment 5 of the present invention.

FIG. 13 is a circuit diagram of a DC-to-DC converter according to Embodiment 5 of the present invention. The DC-to-DC converter according to Embodiment 5 shown in FIG. 13 is configured in the same manner as is the conventional DC-to-DC converter shown in FIG. 1, except that: among other things, the secondary winding S1 and the secondary winding S2 are separated from each other instead of being connected together in series; a series circuit in which the diode D3 and a switching element Q4 formed of a MOSFET are connected together in series is connected between two ends of the secondary winding S1; and a series circuit in which the diode D4 and a switching element Q5 formed of a MOSFET are connected together in series is connected to two ends of the secondary winding S2.

A secondary winding S3 of a transformer T2 is connected between the gate and source of the switching element Q4, and a secondary winding S4 of the transformer T2 is connected between the gate and source of the switching element Q5.

In the control circuit 30: the TS terminal is connected to the oscillating circuit 11a; the FB terminal is connected to the phototransistor of the photocoupler PC; the CG terminal is connected to an end of a primary winding P2 of the transformer T2 through a capacitor C1; and the CS terminal is connected to the other end of the primary winding P2 of the transformer T2 and to the emitter of the phototransistor of the photocoupler PC. A voltage is applied to the FB terminal from the power supply Vcc through the resistor R3. The FB signal is inputted into the FB terminal of the control circuit 30 from the voltage detector circuit 20 through the photocoupler PC.

In the case of the thus-configured DC-to-DC converter according to Embodiment 5, the control circuit 30 generates the pulse signal by receiving the oscillation frequency signal with the fixed frequency from the oscillating circuit 11a, and receives the FB signal at its FB terminal from the voltage detector circuit 20 through the photocoupler PC, as well as accordingly outputs a PWM control signal, which is based on the pulse signal and the FB signal, to the secondary winging S3 and the secondary winding S4 through the primary winding P2 of the transformer T2.

In this respect, once the switching element Q2 is turned on, a short-circuit current flows in the secondary winding S2 through the primary winding P, the secondary winding S2, the diode D4 and the switching element Q5 while the switching element Q5 is on due to a voltage which occurs in the secondary winding S4 through the primary winding P2.

Subsequently, once the switching element Q1 is turned on, a short-circuit current flows in the secondary winding S1 through the primary winding P, the secondary winding S1, the diode D3 and the switching element Q4 while the switching element Q4 is on due to a voltage which occurs in the secondary winding S3 through the primary winding P2.

In this manner, the DC-to-DC converter according to Embodiment 5 can ensure the same effects as can the DC-to-DC converter according to Embodiment 1.

Because the frequency of the oscillation frequency signal from the first control circuit is the fixed frequency, the present invention can easily operate the transformer at a higher frequency with no fluctuation in the frequency. Accordingly, the present invention can provide the DC-to-DC converter being downsized and producing less noise thanks to a transformer capable of operating at the higher frequency.

The present invention is applicable to switching power supply devices.

What is claimed is:

1. A DC-to-DC converter comprising:
a plurality of switching elements connected together in series and connected between two ends of a DC power supply;
a first control circuit configured to alternately turn on and off the plurality of switching elements in response to a constant oscillation frequency signal;
a series circuit in which a primary winding of a transformer and a capacitor are connected together in series, the series circuit being connected to a connecting point between the plurality of switching elements, and to an end of the DC power supply;
a rectifying/smoothing circuit configured to rectify and smooth a voltage which occurs in a secondary winding of the transformer, thus to output a DC voltage;
a full wave rectifier connected to two ends of either the primary or the secondary winding of the transformer, includes a first rectifying element and a second rectifying element;
a control switching element connected to two ends of either the primary or the secondary winding of the transformer through the full wave rectifier, short-circuits two ends of either the primary or the secondary winding of the transformer; and
a second control circuit configured to control the DC voltage at a predetermined voltage by turning on and off the control switching element,
wherein
the secondary winding of the transformer includes a first winding and a second winding,
a first series circuit including the first rectifying element and the control switching element is connected to two ends of the first winding,
a second series circuit including the second rectifying element and the control switching element is connected to two ends of the second winding, and
the second control circuit controls the DC voltage at the predetermined voltage by turning on and off the control switching element based on a voltage of the first winding, a voltage of the second winding, and the DC voltage,
wherein
an anode of the first rectifying element is connected to one end of the first winding, a cathode of the first rectifying element is connected to one end of the control switching element,
an anode of the second rectifying element is connected to one end of the second winding, a cathode of the second rectifying element is connected to the one end of the control switching element, and
other end of the control switching element is connected to a connection point of the first winding and the second winding.

2. A DC-to-DC converter comprising:
a plurality of switching elements connected together in series and connected between two ends of a DC power supply;
a first control circuit configured to alternately turn on and off the plurality of switching elements in response to a constant oscillation frequency signal;
a series circuit in which a primary winding of a transformer and a capacitor are connected together in series, the series circuit being connected to a connecting point between the plurality of switching elements, and to an end of the DC power supply;
a rectifying/smoothing circuit configured to rectify and smooth a voltage which occurs in a secondary winding of the transformer, thus to output a DC voltage;
a full wave rectifier connected to two ends of either the primary or the secondary winding of the transformer, includes a first rectifying element and a second rectifying element;
a control switching element connected to two ends of either the primary or the secondary winding of the transformer through the full wave rectifier, short-circuits two ends of either the primary or the secondary winding of the transformer; and
a second control circuit configured to control the DC voltage at a predetermined voltage by turning on and off the control switching element,
wherein
a first series circuit and a second series circuit are connected together in series between two ends of the secondary winding of the transformer in a way that polarities of the first and second series circuits are reverse to each other, the first series circuit including the first rectifying element and a first control switching element, and the second series circuit including the second rectifying element and a second control switching element, and
the second control circuit controls the DC voltage at the predetermined voltage by simultaneously turning on and off the first and second control switching elements based on a voltage of the secondary winding and the DC voltage, wherein
the secondary winding of the transformer includes a first winding and a second winding,
an anode of the first rectifying element is connected to one end of the first winding, a cathode of the first rectifying element is connected to one end of the first control switching element, an anode of the second rectifying element is connected to one end of the second winding, a cathode of the second rectifying element is connected to the one end of the second control switching element, and each of other end of the first control switching element, and other end of the second control switching element is connected to a connection point of other end of the first winding and other end of the second winding.

3. A DC-to-DC converter comprising:

a plurality of switching elements connected together in series and connected between two ends of a DC power supply;

a first control circuit configured to alternately turn on and off the plurality of switching elements in response to a constant oscillation frequency signal;

a series circuit in which a primary winding of a transformer and a capacitor are connected together in series, the series circuit being connected to a connecting point between the plurality of switching elements, and to an end of the DC power supply;

a rectifying/smoothing circuit configured to rectify and smooth a voltage which occurs in a secondary winding of the transformer, thus to output a DC voltage;

a full wave rectifier connected to two ends of either the primary or the secondary winding of the transformer, includes a first rectifying element and a second rectifying element;

a control switching element connected to two ends of either the primary or the secondary winding of the transformer through the full wave rectifier, short-circuits two ends of either the primary or the secondary winding of the transformer; and a second control circuit configured to control the DC voltage at a predetermined voltage by turning on and off the control switching element;

wherein the secondary winding of the transformer includes a first winding and a second winding, a first series circuit including the first rectifying element and a first control switching element is connected to two ends of the first winding, a second series circuit including the second rectifying element and a second control switching element is connected to two ends of the second winding, and the second control circuit controls the DC voltage at the predetermined voltage by alternately turning on and off the first control switching element and the second control switching element based on the constant oscillation frequency signal from the first control circuit, and the DC voltage, wherein an anode of the first rectifying element is connected to one end of the first winding, a cathode of the first rectifying element is connected to one end of the first control switching element, an anode of the second rectifying element is connected to one end of the second winding, a cathode of the second rectifying element is connected to the one end of the second control switching element, other end of the first control switching element is connected to other end of the first winding, and other end of the second control switching element is connected to other end of the second winding, the other end of the first winding is connected to the other end of the second winding.

* * * * *